US012767376B2

(12) United States Patent
Bardini

(10) Patent No.: US 12,767,376 B2
(45) Date of Patent: Oct. 20, 2026

(54) LABELING MACHINE WITH DETECTION OF PRESENCE OR ABSENCE OF LABELS ON A WORK DRUM

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 136 days.

(21) Appl. No.: 18/839,620

(22) PCT Filed: Jan. 27, 2023

(86) PCT No.: PCT/EP2023/052002

§ 371 (c)(1),
(2) Date: Aug. 19, 2024

(87) PCT Pub. No.: WO2023/156167

PCT Pub. Date: Aug. 24, 2023

(65) Prior Publication Data

US 2025/0162756 A1 May 22, 2025

(30) Foreign Application Priority Data

Feb. 21, 2022 (IT) ........................ 102022000003122

(51) Int. Cl.
*B65C 9/18* (2006.01)
*B65C 9/02* (2006.01)
*B65C 9/42* (2006.01)

(52) U.S. Cl.
CPC .............. *B65C 9/1819* (2013.01); *B65C 9/02* (2013.01); *B65C 9/42* (2013.01)

(58) Field of Classification Search
CPC ............................ B65H 9/1819; B65H 9/1823
See application file for complete search history.

(56) References Cited

U.S. PATENT DOCUMENTS 4,602,977 A 7/1986 Voltmer et al.
2022/0017253 A1* 1/2022 Giuliani ................ B65C 9/1819

FOREIGN PATENT DOCUMENTS

DE 28 16 424 A1 11/1978
DE 20 2018 105 023 U1 11/2018
(Continued)

OTHER PUBLICATIONS

English machine translation of DE2816424 (original cited in IDS) (Year: 1978).*
(Continued)

*Primary Examiner* — Scott W Dodds
(74) *Attorney, Agent, or Firm* — THOMPSON HINE LLP

(57) ABSTRACT

A labeling machine includes a conveyance device for containers to be labeled along an advancement path and at least one labeling assembly, which is arranged along the advancement path of the containers. The labeling assembly includes a work drum which can move in rotation about its own axis and has, on its own lateral surface, suction ports which can be connected, by way of connection elements, to suction mechanisms, in order to allow the work drum to receive so as to adhere, to its own lateral surface, the labels to be transferred to the containers that transit on the conveyance device. Detectors detect the presence or absence of the labels on the work drum. The detectors include at least one sensor for detecting the pressure in the connection elements.

13 Claims, 5 Drawing Sheets

(56) References Cited

FOREIGN PATENT DOCUMENTS

| | | | | |
|---|---|---|---|---|
| EP | 0 646 529 | A2 | 9/1994 | |
| EP | 3 135 594 | A1 | 3/2017 | |
| JP | 2013 133130 | A | 7/2013 | |
| WO | WO-9903738 | A1 * | 1/1999 | ........... B65C 9/1819 |
| WO | 2021/010315 | A1 | 1/2021 | |

OTHER PUBLICATIONS

European Patent Office, International Search Report and Written Opinion, issued May 4, 2023, which pertains to PCT Patent Application No. PCT/EP2023/052002. 9 pgs.

* cited by examiner

LABELING MACHINE WITH DETECTION OF PRESENCE OR ABSENCE OF LABELS ON A WORK DRUM

The present invention relates to a labeling machine.

Labeling machines are known which make it possible to automatically carry out the labeling of containers using labels obtained by cutting a label ribbon on which a plurality of labels are printed in succession.

In general, such labeling machines comprise a conveyor of the containers to be labeled along an advancement path, and at least one labeling assembly, which is arranged along the advancement path of the containers defined by the conveyor and is adapted to apply at least one label on the containers transiting on the conveyor.

Usually, the labeling assembly has a work drum, normally called a transfer drum, which rotates in step with the carousel and makes it possible to apply a respective label on the containers in transit on the carousel, the label having been previously obtained by cutting the label ribbon, which is typically taken from a spool by an unwinding assembly.

The label ribbon can be of the pre-glued type, i.e. it can already have, when it is still wound in a spool, a layer of preapplied adhesive on the side of the labels that is intended to come into contact with the containers, or it can lack preapplied adhesive and, in that case, on the labeling machine there is present an assembly for applying the adhesive to the labels before they are transferred to the containers.

In particular, labeling machines are known in which a cutting drum is interposed between the unwinding assembly and the transfer drum and is designed to receive, on the lateral surface thereof, the label ribbon taken from the unwinding assembly and to cut the individual labels, which are transferred to the transfer drum, which keeps them adhering to its lateral surface using suction ports, until they are brought to adhere to the containers.

Typically, the transfer drum is circumferentially divided into sectors or divisions, each one of which is designed to receive a respective label from the cutting drum.

The cutting drum can be provided with one or more blades, integral therewith, which cut the label ribbon between one label and the next, in cooperation with a stationary blade, which is fixed integrally to the supporting structure of the machine.

Labeling machines are also known in which both the label cutting function and the label transfer function are carried out by the same work drum, which for this reason is called the cutting and transfer drum.

In this case the cutting and transfer drum receives, so that it adheres thereto, by virtue of suction ports on its lateral surface, the label ribbon fed by the unwinding assembly and cuts it using blades, associated therewith, in order to then transfer the individual labels, separated after cutting, to the corresponding container conveyed by the carousel.

For example a work drum is known, disclosed in WO2018/114618 in the name of this same Applicant, which is designed to receive the label ribbon on its lateral surface and is provided, around its lateral surface, with a plurality of cutting devices, each one of which comprises a blade which is integrally fixed to the cutting drum and is accommodated in a corresponding suction chamber, which is open at the lateral surface of the work drum and in communication with air suction means, which make it possible to attract the label ribbon inward into the suction chamber, so as to push it against the blade, resulting in the cutting thereof.

During the operation of the labeling assembly, it is necessary to continuously check the presence of the label ribbon or of the cut labels on the work drum.

Normally, this check is done using photocells which are arranged around the work drum.

For example, a first photocell is positioned in front of a first portion of the work drum which is located upstream of the region for the transfer of the labels from the work drum to the individual containers, with respect to the direction of rotation of the work drum, and the function of which is to detect the presence on the work drum of cut labels that are about to be applied to respective containers.

In front of a second portion of the work drum, which is located immediately downstream of the region for the transfer of the labels from the work drum to the containers, with respect to the direction of rotation of the work drum, a second photocell is positioned, the function of which is to verify the absence of labels on that portion of drum and, therefore, that those labels have effectively been transferred to the containers.

In front of the portion of the work drum that is located, again with respect to the direction of rotation of the work drum, downstream of the second photocell and downstream of a device for expelling untransferred labels from the work drum, there can optionally be a third photocell, the function of which is to confirm the absence of the labels from the work drum, as a result of the activation of the expulsion device, in particular in the event that the second photocell has detected that the label is still present on the work drum.

The use of photocells as described above entails some drawbacks.

Firstly, the presence of the photocells around the lateral surface of the work drum makes it rather difficult to change the work drum in use for another one of different diameter, in that, in this case, it is necessary to reposition the photocells, which, for reasons of space occupation and ease of reading, must be arranged very close to the external surface of the work drum.

Furthermore, the photocells used are not capable of easily detecting transparent labels.

The aim of the present invention is to provide a labeling machine that is capable of avoiding the drawbacks of the known art in one or more of the above mentioned aspects.

Within this aim, an object of the invention is to provide a labeling machine that makes it possible to detect the presence or absence of labels on the work drum of the labeling assembly without using photocells.

Another object of the invention is to provide a labeling machine that is capable of detecting the presence or absence of labels on the work drum of the labeling assembly with no external space occupation around the work drum.

Another object of the invention is to provide a labeling machine that makes it possible to detect the presence or absence of labels on the work drum without influencing operations to change the format of the work drum.

Another object of the invention is to provide a labeling machine that makes it possible to detect the presence or absence of labels on the work drum of the labeling assembly independently of the color of the labels.

A further object of the present invention is to overcome the drawbacks of the background art in a manner that is alternative to any existing solutions.

Another object of the invention is to provide a labeling machine that is highly reliable, is relatively easy to implement and can be produced at low cost.

This aim and these and other objects which will become better apparent hereinafter are achieved by a labeling machine according to claim 1, optionally provided with one or more of the characteristics of the dependent claims.

Further characteristics and advantages of the present invention will become better apparent from the description of preferred, but not exclusive, embodiments of the labeling machine according to the invention, which are illustrated for the purposes of non-limiting example in the accompanying drawings wherein.

Figure 1:
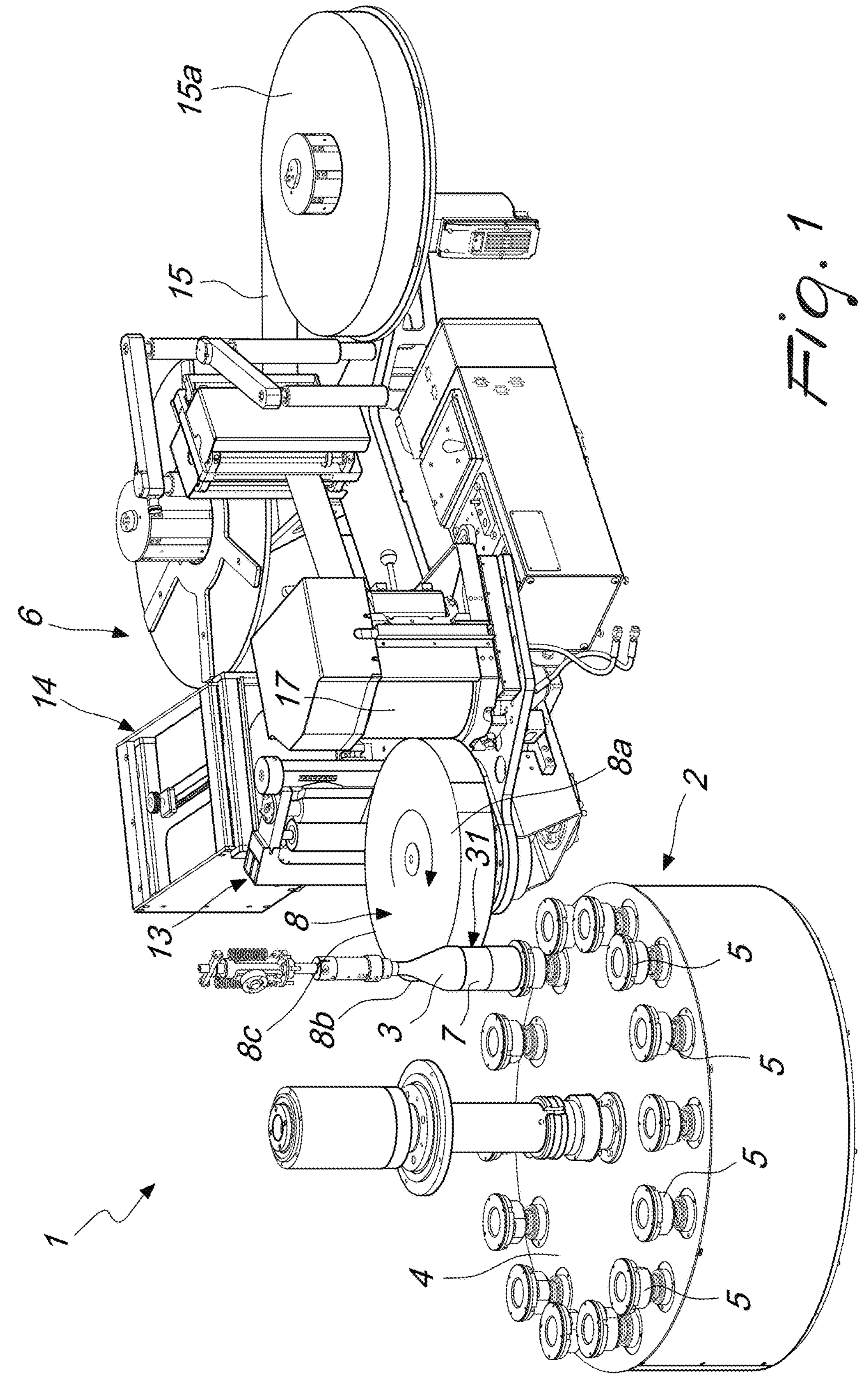
FIG. 1 is a schematic perspective view of a labeling machine according to the invention.
Figure 2:
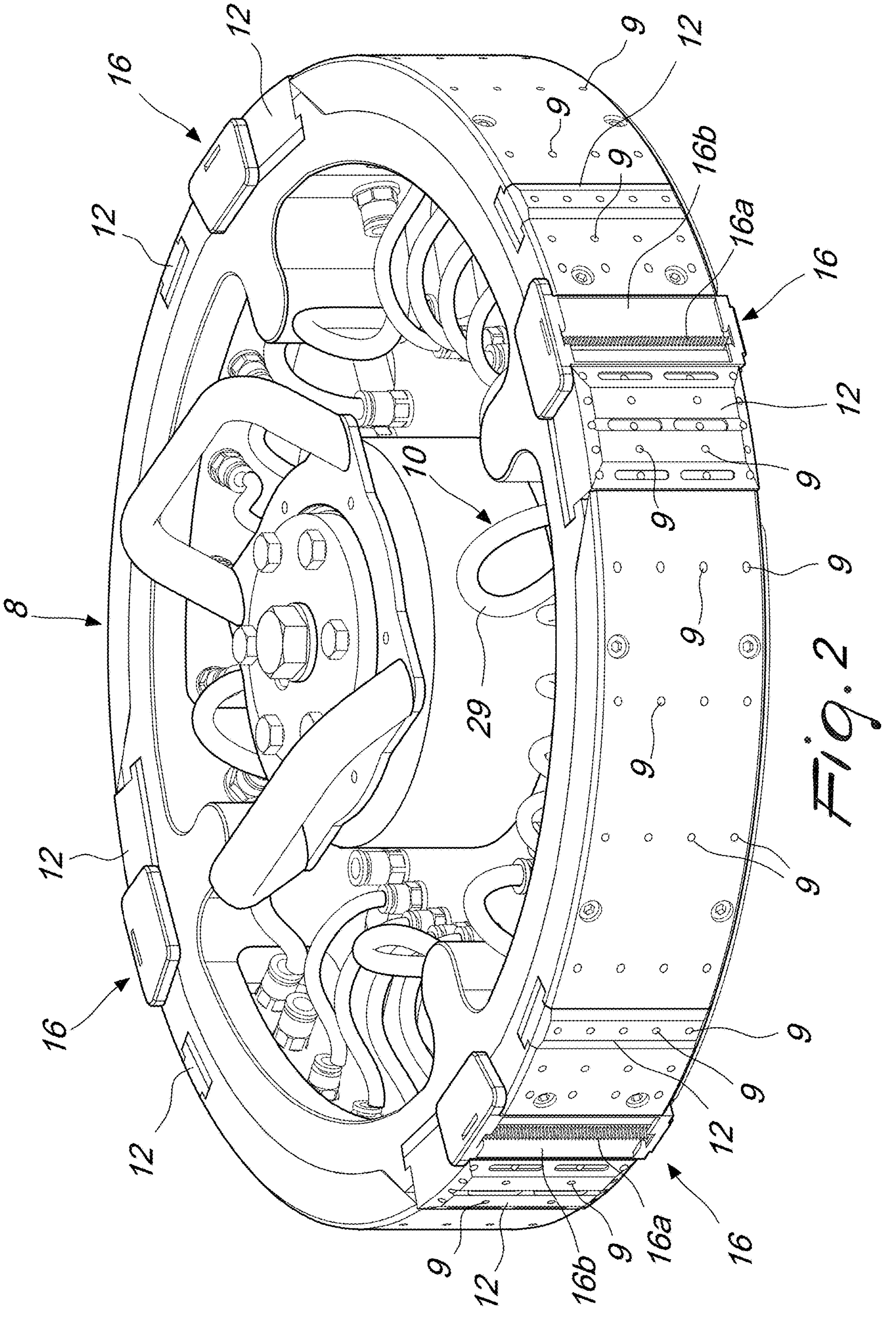
FIG. 2 is a perspective view of a work drum of the machine according to the invention.
Figure 3:
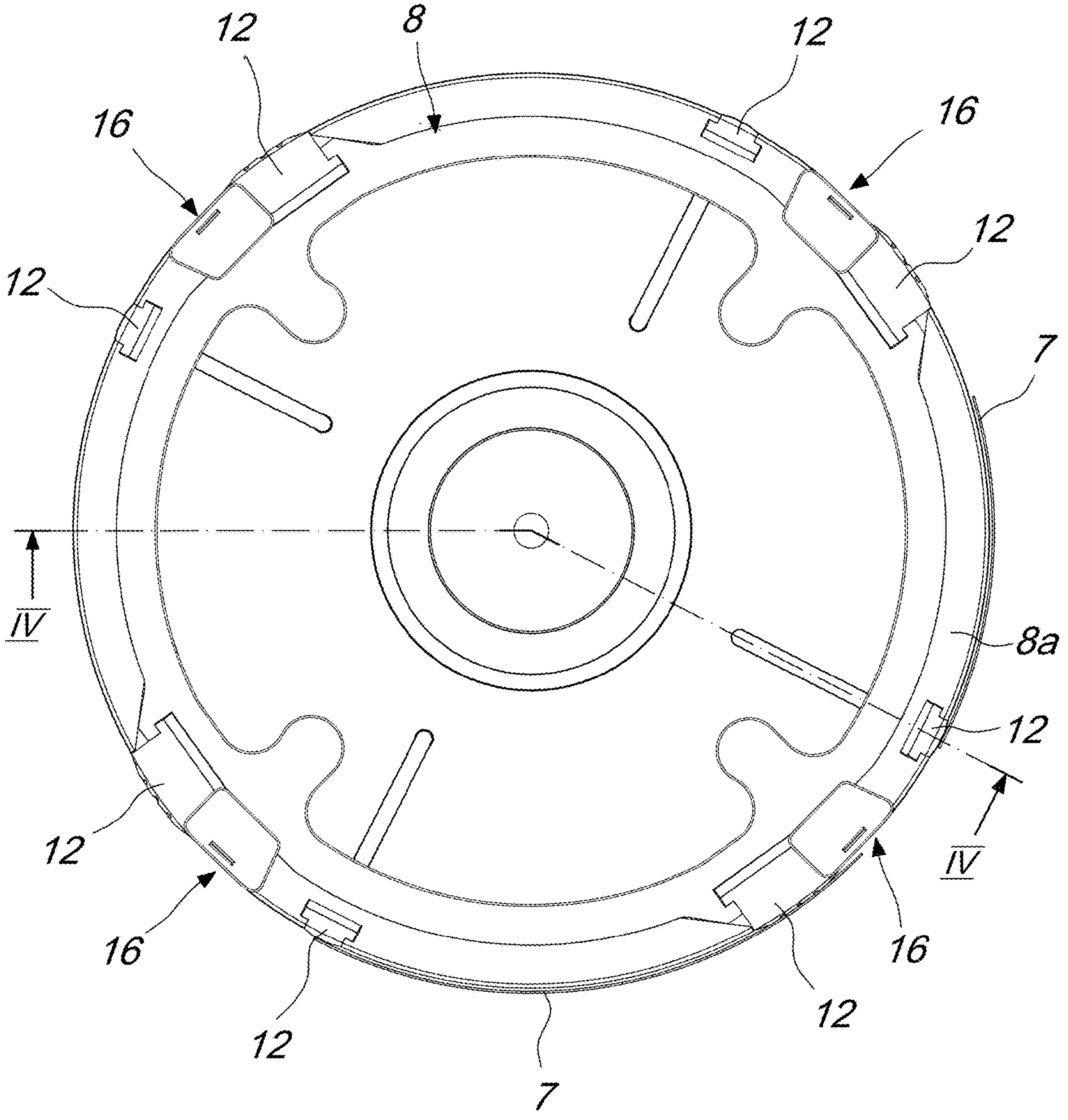
FIG. 3 is a plan view from above of the work drum.

With reference to the figures, the labeling machine according to the present invention, generally designated by the reference numeral 1, comprises conveyance means 2 for containers 3 to be labeled along an advancement path.

Conveniently, the conveyance means 2 comprise a rotating carousel 4, which is fitted peripherally with rotating pans 5 for supporting the individual containers 3 to be labeled.

Along the advancement path of the containers 3, at least one labeling assembly 6 is arranged which applies a respective label 7 on each container 3.

In particular, the labeling assembly 6 comprises a work drum 8, which can move in rotation about its own axis and which has, on its own lateral surface, suction ports 9 which can be connected, by way of connection means 10, to suction means 11, in order to allow the work drum 8 to receive so as to adhere, to its own lateral surface, the labels 7 to be transferred to the containers 3 that transit on the conveyance means 2.

It should be noted that the suction ports 9, as usual, can be defined at runners 12, which are arranged, with at least one portion thereof, in slight relief with respect to the remaining part of the lateral surface of the work drum 8, and can, furthermore, be defined on circumferential portions or sectors of the lateral surface of the work drum 8, positioned between the runners 12.

Conveniently, the work drum 8 is supplied via an unwinding assembly 13 which unwinds, with the interposition of a tensioning device 14, which is per se known, a label ribbon 15 which is taken from a respective spool 15*a*.

Upstream of the work drum 8, in the direction of unwinding of the label ribbon 15, there can be means for cutting the label ribbon 15, which are constituted, for example, by a cutting drum, not shown, and, in such case, the work drum 8 simply performs the function of transfer drum for transferring the labels 7 to the containers 3.

Alternatively, as shown, the work drum 8 can be provided with at least one cutting device 16 which makes it possible to cut the label ribbon 15 which the work drum 8 receives, in this case, directly from the unwinding assembly 13, thus performing the function of cutting and transfer drum.

For example, as also shown, the (or each) cutting device 16 can be constituted by a blade 16*a*, accommodated in a suction chamber 16*b* which is open on the lateral surface of the work drum 8 and can be connected to air suction means, which can, optionally, be constituted by said suction means 11, in order to draw the label ribbon 15 inward into the suction chamber 16*b* and against the blade 16*a*, so as to result in the cutting of the label ribbon 15.

The label ribbon 15 can be of the pre-glued type or it can lack preapplied glue and, in such case, as illustrated, around the work drum 8 means can be arranged for applying glue to the labels 7, which are constituted, for example, by a glue roller 17 that makes it possible to apply respective strips of glue at end regions of each label 7 which are positioned on the runners 12.

Likewise, there are means of detection on the machine which make it possible to detect the presence or absence of labels 7 on the work drum 8.

The means of detection comprise at least one sensor 18 for detecting the pressure present in the connection means 10 that make the connection between the suction ports 9 and the suction means 11 possible.

Advantageously, there is at least one control unit 19, conveniently constituted by an electronic controller, which is functionally connected to the (or to each) sensor 18 and is configured to compare the pressure values detected by the sensor 18 with at least one preset reference pressure value, such as, for example, a pressure value close or substantially equal to the atmospheric pressure value.

In particular, if the label 7 is present on the work drum 8, then the pressure values detected by the sensor 18 within the connection means 10 will be lower than the reference pressure value, owing to the fact that the suction ports 9 are closed by the label 7, while in the absence of the labels 7 the pressure values detected by the sensor 18 will assume values that are closer to the reference pressure value.

Advantageously, the control unit 19 is functionally connected to at least one detector 20 of the angular position of the work drum 8 with respect to a fixed reference position, in order to allow the control unit 19 to correlate the pressure values detected by the sensor 18 with the angular position assumed by the work drum 8, during its rotation.

For example, such detector 20 is constituted by an encoder associated with the rotating shaft 21 of the work drum 8.

Advantageously, signaling means 22 may be provided which are capable of emitting a warning signal, for example an acoustic or luminous signal, which are functionally connected to the control unit 19 and which are activated on command by the control unit 19 in order to emit the warning signal, on the basis of the comparison performed by the control unit 19 between the pressure values detected by the sensor 18 and the reference pressure value.

It should be noted that the sensor 18 is arranged within the lateral space occupation of the work drum 8, so as to facilitate the possibility to substitute the work drum 8 with another one of different dimensions.

In more detail, the connection means 10 comprise a vacuum distribution unit 25, fixed, on which the work drum 8 is mounted so that it can rotate.

At least one suction cavity 26 is defined in the distribution unit 25 and is connected to a vacuum generator 27, which provides the suction means and is constituted, for example, by a vacuum pump.

The (or each) suction cavity 26 has or is connected to at least one communication opening 28, located on the face of the distribution unit 25 that is directed toward the work drum 8.

Figure 4:
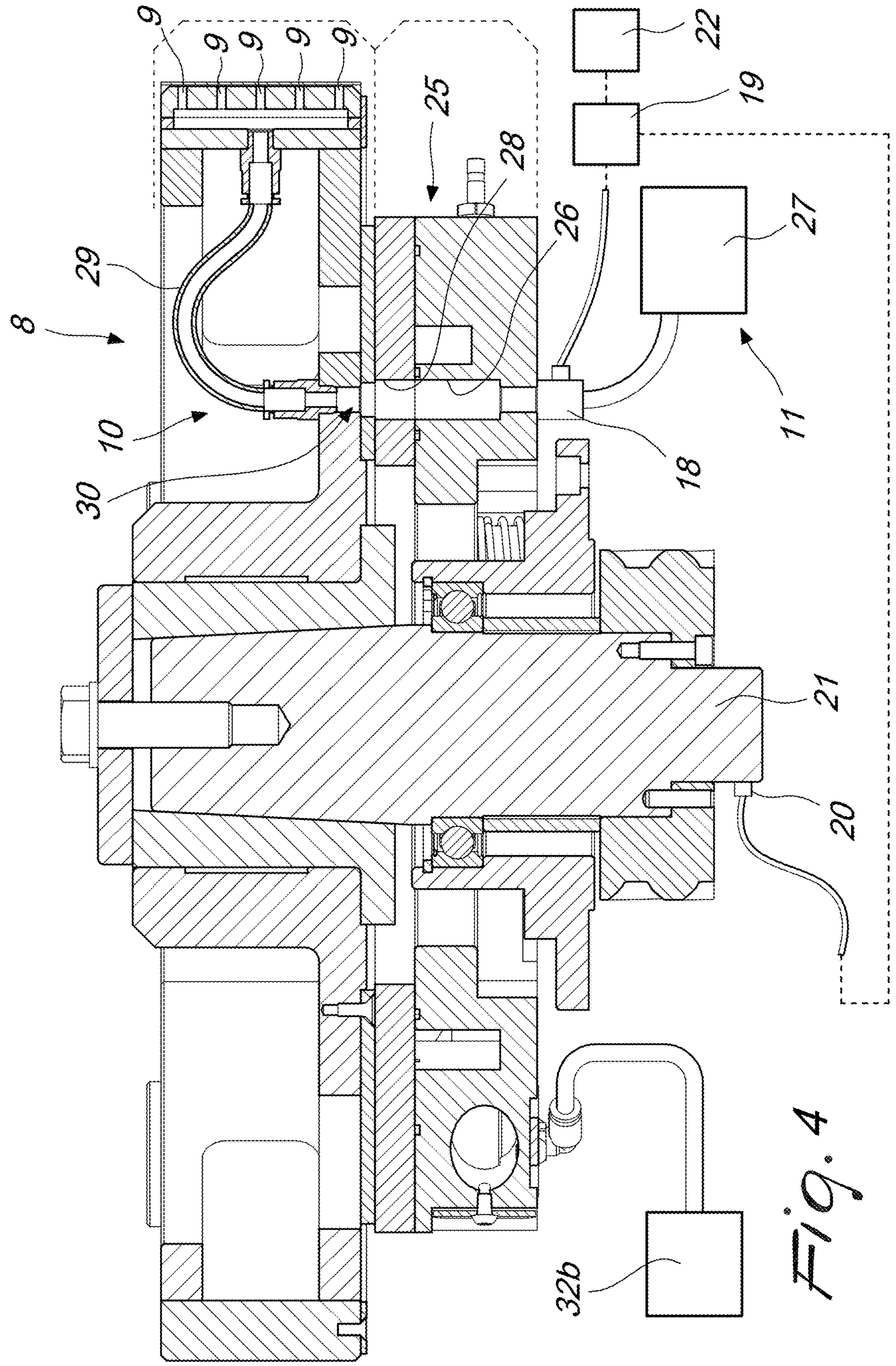
FIG. 4 is a cross-sectional view taken along the line IV-IV of FIG. 3.

As shown, for example, in FIG. 4, the suction ports 9 arranged on the lateral surface of the work drum 8 are in communication, for example by way of at least one duct 29, with at least one connecting opening 30, defined on the face of the work drum 8 that is directed toward the distribution unit 25, so that the connecting opening 30 can establish communication with each communication opening 28 defined on the distribution unit 25, during the rotation of the work drum 8.

It is possible for the sensor 18 to be mounted on the distribution unit 25, as shown in FIG. 4, or, alternatively, it can also be mounted integrally with the work drum 8.

Preferably, in order to allow the detection of the presence or absence of the labels 7 on different portions of the work drum, multiple sensors 18 are provided.

Figure 5:
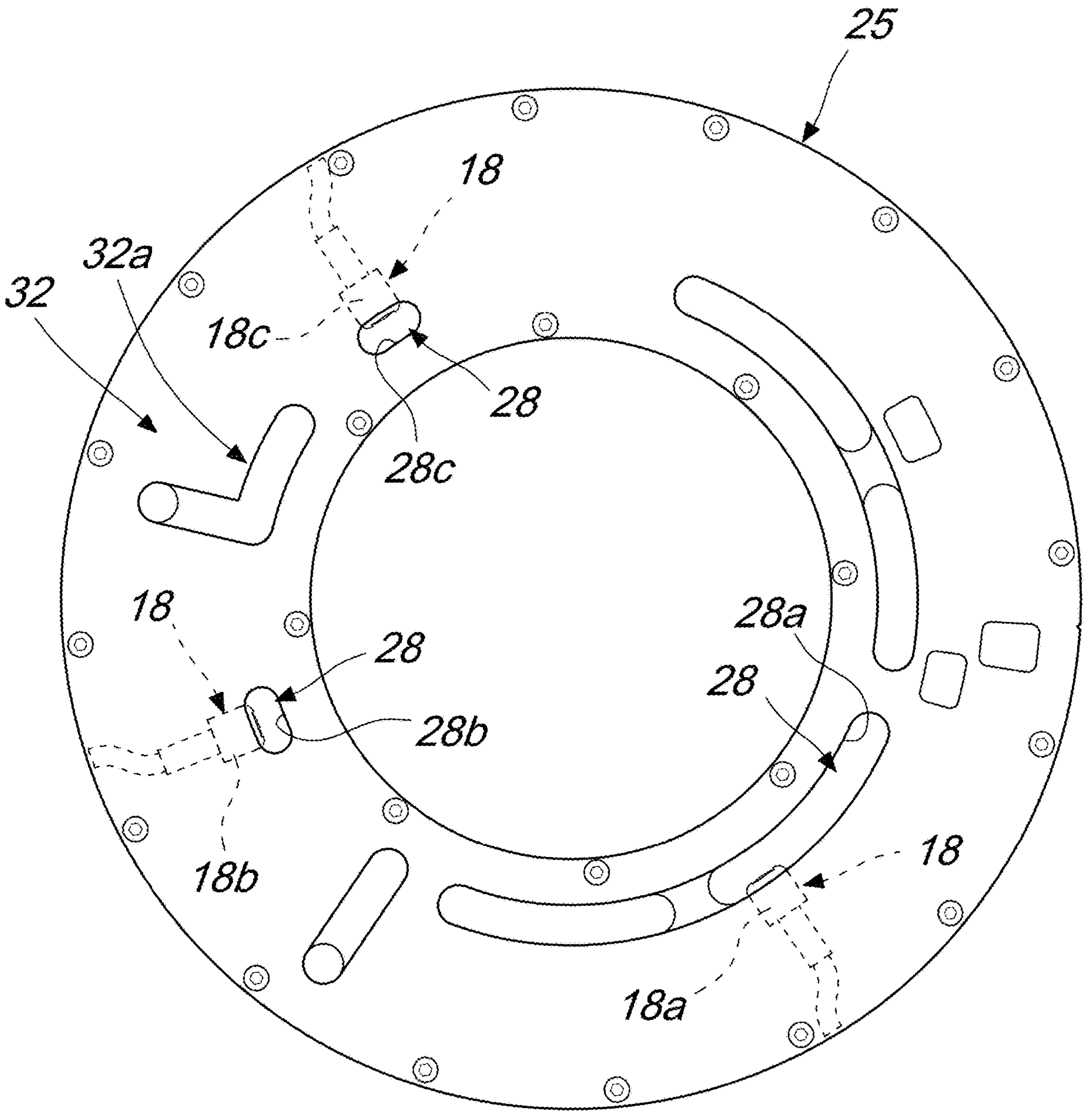
FIG. 5 is a schematic plan view from above of a vacuum distribution unit associated with the work drum of the labeling assembly.

In particular, there can be at least one first sensor, designated with 18*a* in FIG. 5, which is adapted to detect the presence of labels 7 that are about to be applied to corresponding containers 3 and which, therefore, are located on a first portion 8*a* of the work drum 8 which is arranged, with respect to the direction of rotation of the work drum 8, upstream of the region 31 in which the work drum 8 performs the transfer of labels 7 to the containers 3 arriving on the conveyance means 2.

Conveniently, there is a second sensor, designated with 18*b* again in FIG. 5, the function of which is to detect the absence of labels 7 on a second portion 8*b* of the work drum 8 which is located downstream of the region 31 for transferring the labels 7 to the containers 3, with respect to the direction of rotation of the work drum 8, in order to make it possible to verify that the labels 7 have effectively been transferred by the work drum 8 to the containers 3.

Advantageously, also downstream of the region 31 for transferring the labels to the containers, with respect to the direction of rotation of the work drum 8, there is at least one removal device 32 the function of which is to remove from the work drum 8 any labels 7 that are not transferred to the containers 3 in the region 31 for transferring the labels 7 to the containers 3.

For example, as is per se known, such removal device 32 can be provided by the emission, using a set of suction ports 9 arranged in a part of the work drum 8 that is located downstream of the region 31 for transferring the labels 7 to the containers 3, with respect to the direction of rotation of the work drum 8, of a jet of air directed outward, so that such jet of air can remove from the work drum 8 any labels 7 that are not transferred to the containers 3 and which therefore remain on said work drum.

More specifically, the removal device 32 is, for example, provided by having, at the upper surface of the distribution unit 25, at least one opening 32*a* connected to a compressor 32*b* and positioned so as to be in communication with the suction ports 9 of the work drum 8 that are arranged in a part of the work drum 8 that is, in each instance, located downstream of the region 31 for transferring the labels 7 to the containers 3.

Advantageously, there is also at least one third sensor, designated with 18*c*, which is adapted to detect the absence of the labels on a third portion 8*c* of the work drum 8 which is located downstream of the removal device 32, with respect to the direction of rotation of the work drum 8, so as to make it possible to verify that any labels 7 that were not transferred at the transfer region 31 have effectively been removed from the work drum 8 by the removal device 32.

As illustrated in particular in FIG. 5, in the distribution unit 25 at least one first communication opening is defined, designated with 28*a*, which enables the connection to the vacuum generator 27 of the suction ports 9 located on the first portion 8*a* of the work drum 8.

Conveniently, the first communication opening 28*a* has an elongated slot shape and extends substantially parallel to the segment of the path of the labels 7 on the work drum 8 along which it is necessary for the labels 7 to be kept against the lateral surface of the work drum 8 so they can be conveyed toward the region 31 for transferring to the containers 3.

Advantageously, as shown in FIG. 5, the first sensor 18*a* is associated with the first communication opening 28*a* of the distribution unit 25.

Again, as can be seen in FIG. 5, in the distribution unit 25 there is a second communication opening 28*b*, arranged angularly spaced apart with respect to the first communication opening 28*a*, about the axis of the distribution unit 25, in order to enable the connection to the vacuum generator 27 of suction ports 9 located on the second portion 8*b* of the work drum 8.

As illustrated, the second sensor 18*b* is, conveniently, associated with the second communication opening 28*b*.

Furthermore, in the distribution unit 25 there is advantageously at least one third communication opening 28*c*, the function of which is to enable the connection to the vacuum generator 27 of suction ports 9 located at the third portion 8*c* of the work drum 8.

In this case, the third sensor 18*c* is associated with the third communication opening 28*c*.

The operation of the machine, according to the invention, is the following.

The work drum 8 receives the label ribbon 15 fed by the unwinding assembly 13 substantially at the first portion 8*a* and holds it by virtue of the suction ports 9 which are present in the first portion 8*a*.

The labels 7 that are positioned on the first portion 8*a* of the work drum 8 receive glue from the glue roller 17 and are cut from the label ribbon 15 by the cutting devices 16 before arriving at the transfer region 31, where they are transferred from the work drum 8 to a respective container 3, which is in transit on the conveyance means 2.

The control unit 19 receives, from the first sensor 18*a*, the pressure values that are effectively present at the first communication opening 28*a* and compares them with the reference pressure value, which is set for example to the atmospheric pressure value.

When there are labels 7 present on the first portion 8*a* of the work drum 8, the pressure values detected by the first sensor 18*a* will be lower, by more than a preset threshold value, than the reference pressure value, such that the control unit 19 deduces, from the comparison between the pressure values detected by the first sensor 18*a* and the reference pressure value, the presence of the labels 7 on the first portion 8*a* of the work drum 8.

If, instead, the pressure values detected by the first sensor 18*a* should be substantially equal or in any case close to the reference pressure value, then the control unit 19 would deduce the absence of the labels 7 on the first portion 8*a* of the work drum 8.

Having arrived at the transfer region 31, the labels 7 are transferred to the respective containers 3, such that the second portion 8*b* of the work drum 8 has no labels 7.

As a consequence, the second sensor 18*b* detects pressure values substantially equal or close to the reference pressure value and, therefore, from the comparison between the pressure values received from the second sensor 18*b* and the reference pressure value, the control unit 19 deduces the absence of labels 7 on the second portion 8*b* of the work drum 8.

If, instead, the labels 7 are not transferred in the transfer region 31, for example owing to a lack of containers 3 on the conveyance means 2 or other anomaly, then there will be labels 7 present on the second portion 8*b* of the work drum 8, which is detected by the control unit 19 due to the fact that the pressure values received from the second sensor 18*b* are lower, by more than a preset threshold value, than the reference pressure value.

Any labels 7 that are not transferred at the transfer region 31 to containers 3 and which remain on the work drum 8 are subsequently removed from the work drum 8 by the removal device 32.

Following the removal, by the removal device 32, of the labels 7 not transferred from the work drum 8 at the transfer region 31, the control unit 19 verifies, by way of comparison between the pressure values detected by the third sensor 18*c* and the reference pressure value, the effective absence of labels 7 on the third portion 8*c* of the work drum 8.

If, owing to an operating anomaly of the removal device 32, the labels 7 should not be removed from the work drum 8 by the removal device 32, the control unit 19 deduces the presence of labels on the third portion 8*c* of the work drum 8 by the fact that the pressure values detected by the third sensor 18*c* are lower, by more than a preset threshold value, than the reference value.

In this case, the control unit 19 can activate the signaling means 22, to alert the operators to the anomaly in the operation of the removal device 32.

It should be noted that the control unit 19 can also verify the possible presence of blockages in the suction ports 9 or in the connection means 10, if it finds deviations between the pressure values detected by the sensors 18 and the values expected under normal operating conditions, both in the presence and in the absence of labels 7.

In practice it has been found that the invention fully achieves the intended aim and objects by providing a labeling machine that, by virtue of sensors for detecting pressure, is able, by way of a pressure measurement, to monitor the presence or absence of labels on the work drum, completely independently of the color of the labels and with no space occupation outside the drum, in that the sensors are inside the work drum and their position does not depend on the dimensions of said work drum.

Another advantage of the machine according to the invention is that it makes it possible, again by using sensors for detecting pressure, to detect the possible blockage of suction ports of the work drum, making it possible to intervene to carry out preventive cleaning of the ducts or to replace the blocked parts.

The invention thus conceived is susceptible of numerous modifications and variations, all of which are within the scope of the appended claims. Moreover, all the details may be substituted by other, technically equivalent elements.

In practice, the materials used, as well as the contingent shapes and dimensions, may be any according to the requirements and to the state of the art.

The disclosures in Italian Patent Application No. 102022000003122 from which this application claims priority are incorporated herein by reference.

The invention claimed is:

1. A labeling machine comprising:

conveyance means for containers to be labeled along an advancement path;

suction means for generating a suction force; and at least one labeling assembly arranged along said advancement path of the containers, said labeling assembly comprising:

a work drum configured to move in rotation about an axis thereof, the work drum having a lateral surface with suction ports thereon;

connection means for connecting said suction ports to said suction means in order to allow said work drum to receive labels to be transferred to the containers conveyed by the conveyance means, said labels adhering to the lateral surface;

detection means for detecting the presence or absence of the labels on said work drum, wherein said detection means comprise at least one sensor for detecting pressure in said connection means;

the labeling machine further comprising:

at least one control unit functionally connected to said at least one sensor and configured to compare pressure values detected by said at least one sensor with at least one reference pressure value;

at least one detector of an angular position of said work drum with respect to a fixed reference position, said detector being functionally connected to said control unit, said control unit configured to correlate the pressure values detected by said at least one sensor with the angular position assumed by said work drum.

2. The labeling machine according to claim 1, further comprising signaling means which are functionally connected to said control unit and are configured to be activated on command by said control unit in order to emit a warning signal, on the basis of a comparison, performed by said control unit, between the pressure values detected by said at least one sensor and said reference pressure value.

3. The labeling machine according to claim 1, wherein said at least one sensor is arranged within said work drum.

4. The labeling machine according to claim 1, wherein said suction means comprise a vacuum generator and wherein said connection means comprise a vacuum distribution unit, on which said work drum is mounted so that it can rotate, at least one suction cavity being defined in said vacuum distribution unit and being connected to said vacuum generator and being provided with at least one communication opening located on a face of said vacuum distribution unit that is directed toward said work drum, said suction ports being in communication with at least one connecting opening defined on a face of said work drum that is directed toward said vacuum distribution unit, in order to establish communication with said at least one communication opening, during the rotation of said work drum.

5. The labeling machine according to claim 4, wherein said at least one sensor is mounted on said vacuum distribution unit.

6. The labeling machine according to claim 1, wherein said at least one sensor is mounted on said work drum.

7. The labeling machine according to claim 4, wherein said at least one sensor comprises at least one first sensor, in order to allow detection of the presence of the labels on a first portion of said work drum which is located upstream of a region for transferring the labels to said containers, with respect to a direction of rotation of said work drum.

8. The labeling machine according to claim 7, wherein said at least one sensor comprises at least one second sensor, in order to make it possible to detect the absence of the labels on a second portion of the work drum which is located downstream of the region for transferring the labels to said containers, with respect to the direction of rotation of said work drum.

9. The labeling machine according to claim 8, further comprising, downstream of said region for transferring the labels to said containers, with respect to the direction of rotation of said work drum, at least one removal device for labels not transferred to said containers in said region for transferring the labels to said containers.

10. The labeling machine according to claim 8, wherein said at least one sensor comprises at least one third sensor for detecting the absence of the labels on a third portion of the work drum which is located downstream of said removal device, with respect to the direction of rotation of said work drum.

11. The labeling machine according to claim 8, wherein at least one first communication opening is defined in said vacuum distribution unit for the connection of suction ports located on said first portion of said work drum to said vacuum generator, said first sensor being associated with said first communication opening.

12. The labeling machine according to claim 11, wherein at least one second communication opening is defined in said vacuum distribution unit for the connection of suction ports located on said second portion of said work drum to said vacuum generator, said second sensor being associated with said second communication opening.

13. The labeling machine according to claim 12, wherein at least one third communication opening is defined in said vacuum distribution unit for the connection of suction ports located on said third portion of said work drum to said vacuum generator, said third sensor being associated with said third communication opening.

* * * * *